United States Patent
Demar et al.

(10) Patent No.: US 7,845,082 B2
(45) Date of Patent: Dec. 7, 2010

(54) UNIVERSAL HAND PRUNER WITH EXTENDIBLE HANDLES

(75) Inventors: David Demar, Tenafly, NJ (US); Thomas VanDyk, Ramsey, NJ (US); Roland Charriez, Mohegan Lake, NY (US); Michael Ballone, New Providence, NJ (US); John Kiely, Morris Plains, NJ (US); Keith Kristiansen, Stratford, CT (US); Melissa Fisher, Columbus, OH (US); Brian J. Conaway, Columbus, OH (US); Mandi Reese, Westerville, OH (US); Terry M. Birchler, New Albany, OH (US); Mark C. Eyman, Columbus, OH (US)

(73) Assignee: Ames True Temper, Inc., Camp Hill, PA (US)

( * ) Notice: Subject to any disclaimer, the term of this patent is extended or adjusted under 35 U.S.C. 154(b) by 1091 days.

(21) Appl. No.: 11/095,777

(22) Filed: Mar. 31, 2005

(65) Prior Publication Data
US 2005/0241158 A1 Nov. 3, 2005

Related U.S. Application Data

(60) Provisional application No. 60/567,392, filed on Apr. 30, 2004.

(51) Int. Cl.
*B26B 13/00* (2006.01)
*B26B 17/00* (2006.01)
(52) U.S. Cl. .............. 30/199; 30/177; 30/249; 30/321
(58) Field of Classification Search ............ 30/249, 30/250, 252, 340, 341, 199, 256, 255, 519, 30/320–321, 177, 248, 257, 193; 140/119
See application file for complete search history.

(56) References Cited

U.S. PATENT DOCUMENTS

| | | | | | |
|---|---|---|---|---|---|
| 508,022 | A | * | 11/1893 | Burger et al. | 30/250 |
| 852,479 | A | * | 5/1907 | Weiss | 81/349 |
| 883,457 | A | * | 3/1908 | Geis | 30/250 |
| 1,758,781 | A | * | 5/1930 | Burger et al. | 30/250 |
| 3,596,355 | A | * | 8/1971 | Wertepny, Sr. | 30/252 |
| 5,317,806 | A | * | 6/1994 | Held et al. | 30/249 |
| 5,826,338 | A | * | 10/1998 | Chilton et al. | 30/90.1 |
| 6,105,257 | A | * | 8/2000 | Rutkowski et al. | 30/199 |
| 6,249,976 | B1 | * | 6/2001 | Osame | 30/199 |

(Continued)

*Primary Examiner*—Laura M. Lee
(74) *Attorney, Agent, or Firm*—Eckert Seamans Cherin & Mellott, LLC; David C. Jenkins, Esquire (57) ABSTRACT

A hand tool for cutting includes a first handle, a second handle pivotably connected to the first handle, and a cutting head including a fixed first blade and a pivotable second blade to provide cutting action with the first blade. The first and second handles are movable between a fully retracted configuration and a fully extended configuration to selectively adjust the length of the handles. The cutting head is selectively rotatable about a central longitudinal axis and carries the blades upon rotation of the cutting head to move the blades between a plurality of different orientations relative to the first and second handles. The cutting head includes a connector operably connecting the second handle and the second blade so that pivoting motion of the second handle moves the second blade relative to the first blade to provide cutting action therebetween.

11 Claims, 4 Drawing Sheets

U.S. PATENT DOCUMENTS

| | | | |
|---|---|---|---|
| 6,523,266 B2 * | 2/2003 | Yang | 30/252 |
| 6,918,324 B2 * | 7/2005 | Hsien | 81/427.5 |
| 2003/0221321 A1 * | 12/2003 | Cheng | 30/252 |
| 2004/0010924 A1 * | 1/2004 | Hung et al. | 30/255 |
| 2005/0081386 A1 * | 4/2005 | Chang | 30/151 |

* cited by examiner

UNIVERSAL HAND PRUNER WITH EXTENDIBLE HANDLES

CROSS-REFERENCE TO RELATED APPLICATIONS

This application claims the priority benefit of U.S. Provisional Patent Application No. 60/567,392 filed on Apr. 30, 2004, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to hand-held tools for cutting and, more particularly, to hand pruners for landscaping, gardening and the like.

BACKGROUND OF THE INVENTION

A variety of different hand-held tools are commonly used for landscaping and gardening such as hand pruners. These hand pruners can be of the scissors or anvil type but both types typically have a lower handle member and an upper or operating handle member which is pivotally connected to the lower handle member by a pivot pin. A blade is connected to the lower handle which cooperates with a hook that is operatively connected to the upper handle through a linkage so that the blade and hook provide a cutting action when the upper and lower handles are squeezed together. See U.S. Pat. No. 5,469,625, the disclosure of which is expressly incorporated herein in its entirety by reference, for an example of a hand pruner.

While these prior hand pruners may be adequate to perform intended landscaping and gardening tasks under some conditions, they can be difficult and uncomfortable to grasp and hold, particularly with two hands, and can require the operator to have a relatively large amount of hand strength and or dexterity. This can particularly be a concern when the hand pruners are used by women, elderly, or handicapped users. Additionally, there is a never ending desire to improve certain characteristics of such hand pruners such as, for example, quality, reliability, versatility, weather-resistance, high strength, low weight, and low manufacturing costs. Accordingly, there is a need in the art for improved hand pruners.

SUMMARY OF THE INVENTION

The present invention provides a hand pruner which overcomes at least some of the above-noted problems of the related art. According to the present invention, a hand tool for cutting comprises, in combination, a first handle, a second handle, a first blade, and a second blade sized and shaped to provide cutting action with the first blade. The first and second handles are each operatively connected to at least one of the first and second blades so that the first and second blades cooperate to provide cutting action upon actuation of the first and second the handles. The first and second handles are each movable between a filly retracted configuration and a fully extended configuration to selectively adjust the length of the handles According to another aspect of the present invention, a hand tool for cutting comprises, in combination, a cutting head including a first blade and a second blade sized and shaped to provide cutting action with the first blade, an upper handle, and a lower handle. The first and second handles are each operatively connected to the cutting head so that the first and second blades cooperate to provide cutting action upon actuation of the first and second the handles. The cutting head is selectively rotatable about a central longitudinal axis and the cutting head carries the first and second blades upon rotation of the cutting head about the central longitudinal axis to move the first and second blades between a plurality of different orientations relative to the first and second handles.

According to another aspect of the present invention, a hand tool for cutting comprises, in combination, a first handle, a second handle pivotally connected to the first handle, and a cutting head including a fixed first blade and a pivotable second blade sized and shaped to provide cutting action with the first blade. The first and second handles are each movable between a fully retracted configuration and a fully extended configuration to selectively adjust the length of the handles. The cutting head is selectively rotatable about a central longitudinal axis and the cutting head carries the first and second blades upon rotation of the cutting head about the central longitudinal axis to move the first and second blades between a plurality of different orientations relative to the first and second handles. The cutting head includes a connector operably connecting the second handle and the second blade so that pivoting motion of the second handle relative to the first handle moves the second blade relative to the first blade to provide cutting action therebetween and the cutting head is rotatable about the longitudinal axis.

From the foregoing disclosure and the following more detailed description of various preferred embodiments it will be apparent to those skilled in the art that the present invention provides a significant advance in the technology of hand pruners. Particularly significant in this regard is the potential the invention affords for providing a high quality, reliable, versatile, and easy to use tool with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 5:
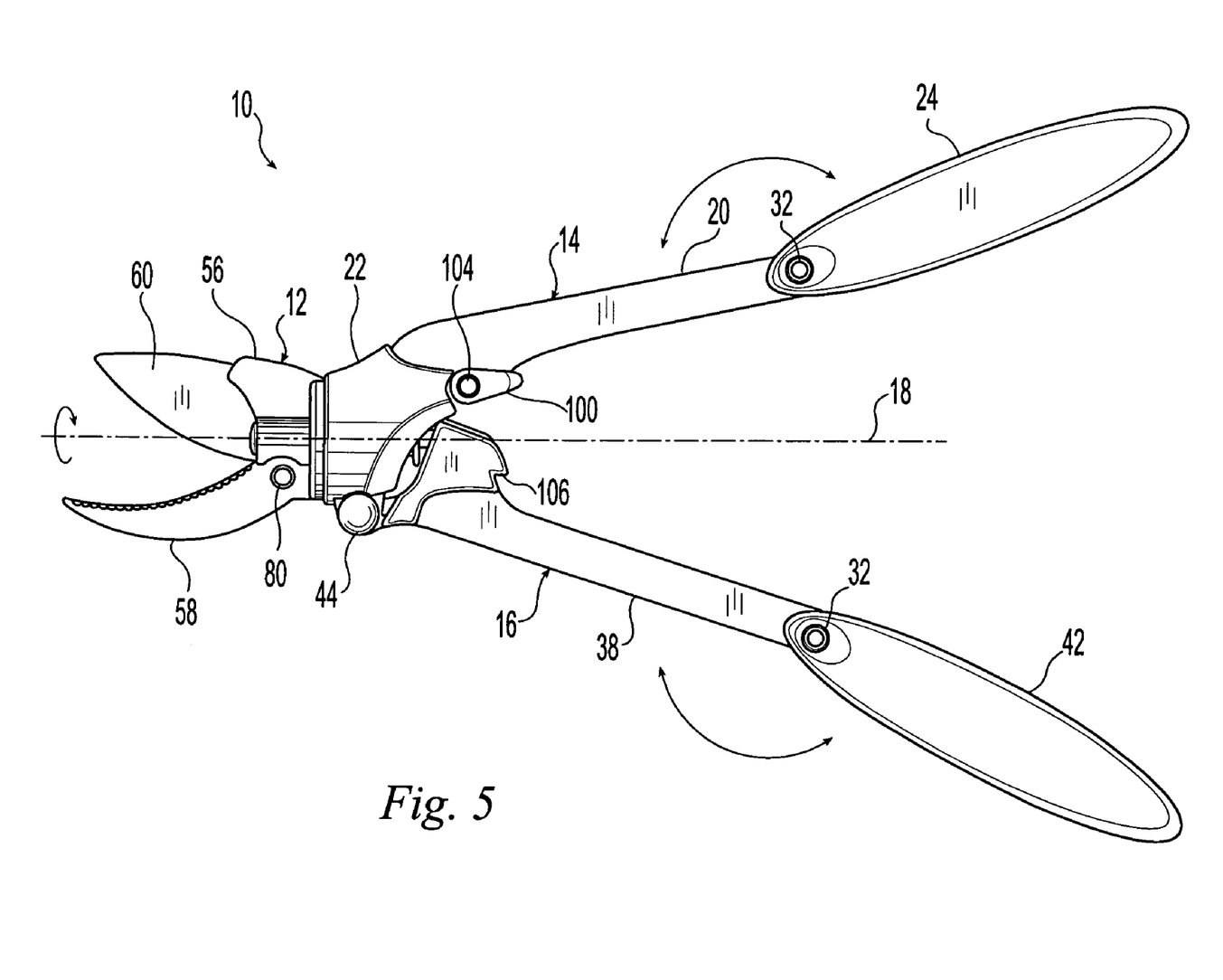
FIG. 5 is a right-side elevational view of the pruner of FIGS. 1 to 4, wherein the pruner is in an open position and the handles of the pruner are in an extended configuration.

It should be understood that the appended drawings are not necessarily to scale, presenting a somewhat simplified representation of various preferred features illustrative of the basic principles of the invention. The specific design features of the hand pruners as disclosed herein, including, for example, specific dimensions, orientations, materials, configurations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tool illustrated in the drawings. In general, up or upward refers to an upward direction within the plane of the paper in FIGS. 5 and 7 and down or downward refers to a downward direction within the plane of the paper in FIGS. 5 and 7. Also in general, front, fore or forward refers to a direction toward a blade or cutting head end of the hand pruners, that is a leftward direction within the plane of the paper in FIGS. 5 and 7, and aft, rear or rearward refers to a direction toward a handle end of the hand pruners opposite the blade end, that is a rightward direction within the plane of the paper in FIGS. 5 and 7.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hand-held tool for cutting disclosed herein. The following detailed discussion of various alternative and preferred embodiments will illustrate the general principles of the invention with reference to hand pruners for use in landscaping and garden environments. Other embodiments suitable for other applications will be apparent to those skilled in the art given the benefit of this disclosure.

Referring now to the drawings, FIGS. 1 to 6 illustrate a hand pruner 10 according to a preferred embodiment of the present invention. The illustrated hand pruner 10 includes a universal cutting head 12 and first and second handles 14, 16 rearwardly extending from the cutting head 12 and operably connected to the cutting head 12 to selectively actuate the cutting head 12. The universal cutting head 12 is selectively rotatable about a central longitudinal axis 18 of the hand pruner 10 to adjust the orientation of the cutting head 12 as described in more detail hereinafter. The illustrated handles 14, 16 are selectively convertible between retracted and extended configurations to change the effective length of the handles 14, 16 as described in more detail hereinafter.

The illustrated first or upper handle 14 includes an elongate first arm 20 having a body 22 at a forward end for cooperating with the cutting head 12 and a first grip 24 secured to a rearward end of the first arm 20 for grasping by the user. The illustrated body 22 forms a longitudinally extending passage 26 defining the central longitudinal axis 18 of the hand pruner 10. The passage 26 is sized and shaped to cooperate with the cutting head 12. The illustrated passage 26 forms a cylindrical-shaped bearing surface for the cutting head 12. The illustrated body 22 also forms a forward facing, annular-shaped first or forward abutment encircling the forward end of the passage 26 and a rearward facing, annular-shaped second or rearward abutment encircling the rearward end of the passage 26. The first and second abutments are sized and shaped to cooperate with the cutting head 12 as described in more detail hereinafter. The rear portion of the illustrated first arm 20 extends rearwardly and upwardly from an upper side of the body 22 located above the central longitudinal axis 18. The first arm 20 can be formed of any suitable material such as, for example, plastic, steel, aluminum or the like.

Figure 6:
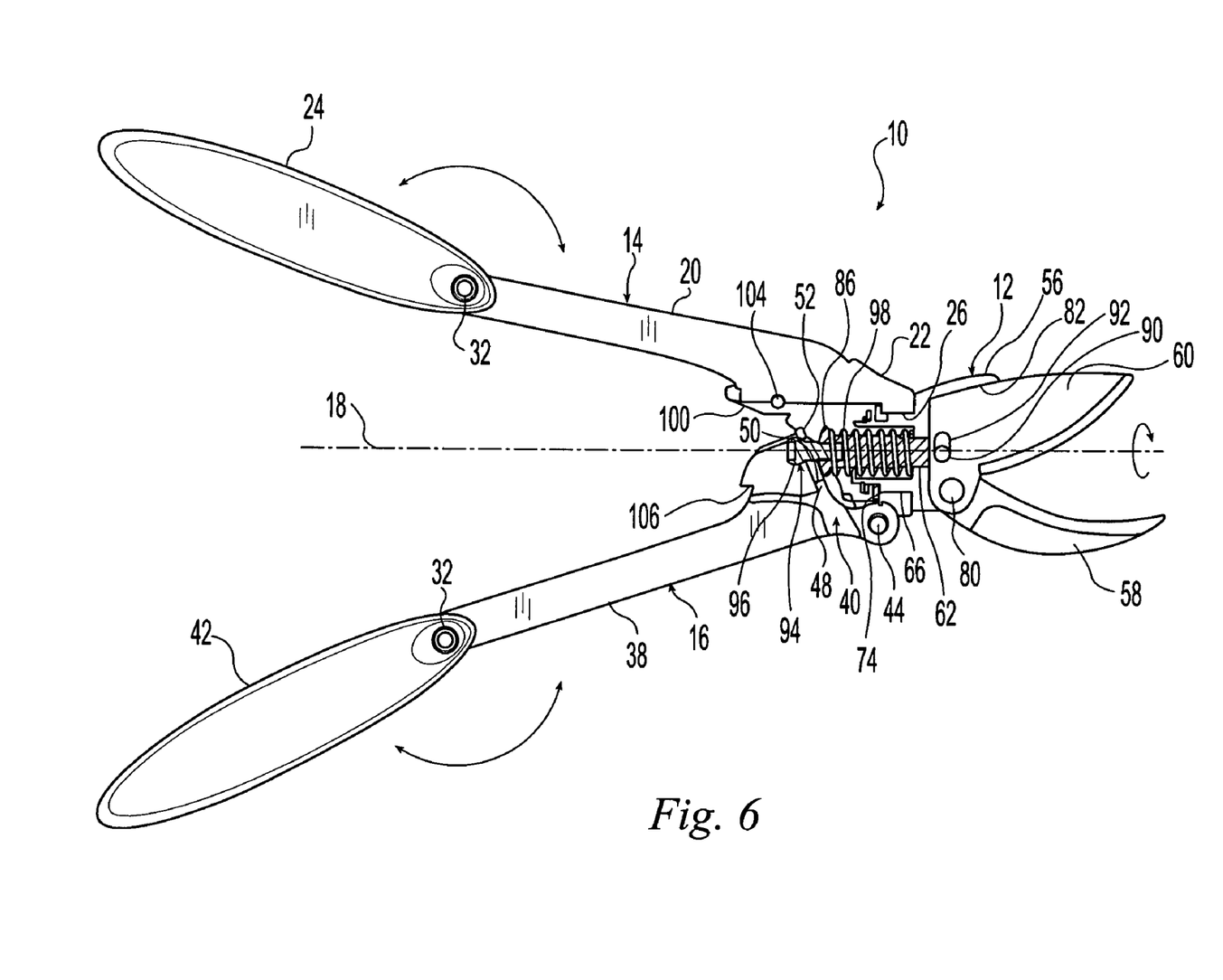
FIG. 6 is a left-side elevational view of the pruner of FIG. 5 wherein portions of various components are cut-away for clarity.

The first grip 24 is sized and shaped to accommodate grasping by the user and is selectively movable between a fully retracted configuration (best shown in FIGS. 1 to 4) and a fully extended configuration (best shown in FIGS. 6 and 7). In both the retracted and extended configurations, the user can grasp the first grip 24 to actuate the cutting head 12. However, in the extended configuration the first handle 14 has a greater length so that the user has greater reach and greater leverage in actuating the cutting head 12 and thus less force is required to generate the same cutting force at the cutting head 12. The illustrated first grip 24 is pivotably secured to a rear end of the first arm 20 by a rivet 32. It is noted that any other suitable type of fastener can be alternatively utilized. The illustrated first grip 24 pivots about a laterally extending axis 34 formed by the rivet 32 which extends perpendicular to the longitudinal axis 18 of the hand pruner 10. In the fully retracted configuration, the first grip 24 is located adjacent the first arm 20 and moves with the first arm 20 as a user grasps the handles 14, 16 and squeezes them together to generate a cutting force at the cutting head 12. Downward movement of the illustrated first grip 24 relative to the first arm 20 about the pivot axis 34 is prevented by engagement of a free end of the first grip 24 with an abutment formed by the first arm body 22. The illustrated first grip 24 is provided with a longitudinally extending slot or groove 36 receiving the first arm 20 therein when the first grip 24 is in the retracted configuration so that the first grip 24 overlies a rear portion of the first arm 20.

To move the first grip 24 to its extended configuration, the free end of the first grip 24 is moved upwardly relative to the first arm 20 and pivoted about the pivot axis 34 so that the first grip 24 moves rearwardly and downwardly to the fully extended position. In the fully extended configuration, the first grip 24 extends rearwardly from the rear end of the first arm 20 so that the first grip 24 forms a rearward extension of the first arm 20 to increase the effective length of the first handle 14 and moves with the first arm 20 as a user grasps the handles 14, 16 and squeezes them together to generate a cutting force at the cutting head 12. Further downward movement of the illustrated first grip 24 relative to the first arm 20 about the pivot axis 34 is prevented by engagement of the secured end of the first grip 24 with an abutment formed by the first arm 20. If desired, means for biasing and/or locking the first grip 24 in either or both of the fully retracted and extended configurations can be provided such as, for example, means provided to a blade of a pocket knife. The locking means can alternatively and/or additionally provide for infinite adjustment over the entire range of motion of the first grip 24. The locking means can be of any suitable type.

The first grip 24 is preferably ergonomically shaped or sculpted to provide comfortable hand positions for the user. The first grip 24 can be formed of any suitable material such as, for example, plastic, steel, aluminum or the like. The first grip 24 preferably has a slip resistant surface provided by a plastic surface, covering or coating. It is noted that any other suitable type of extendible grip 24 can be alternatively utilized such as, for example, a grip which is telescopically movable relative to the handle arm 20.

The illustrated second or lower handle 16 includes an elongate second arm 38 having an actuator 40 at a forward end for cooperating with the cutting head 12 and a second grip 42 secured to a rearward end of the second arm 38 for grasping by the user. The forward end of the second arm 38 is pivotably secured to the body 22 of the first handle 14 by a bolt and nut 44. It is noted that any other suitable type of fastener can be alternatively utilized. The illustrated second handle 16 pivots relative to the first handle 14 about a laterally extending pivot axis 46 formed by the bolt 44 which extends perpendicular to the longitudinal axis 18 of the hand pruner 10. The illustrated pivot axis 46 is located below the central longitudinal axis 18 and below a rearward end of the body passage 26.

Figure 4:
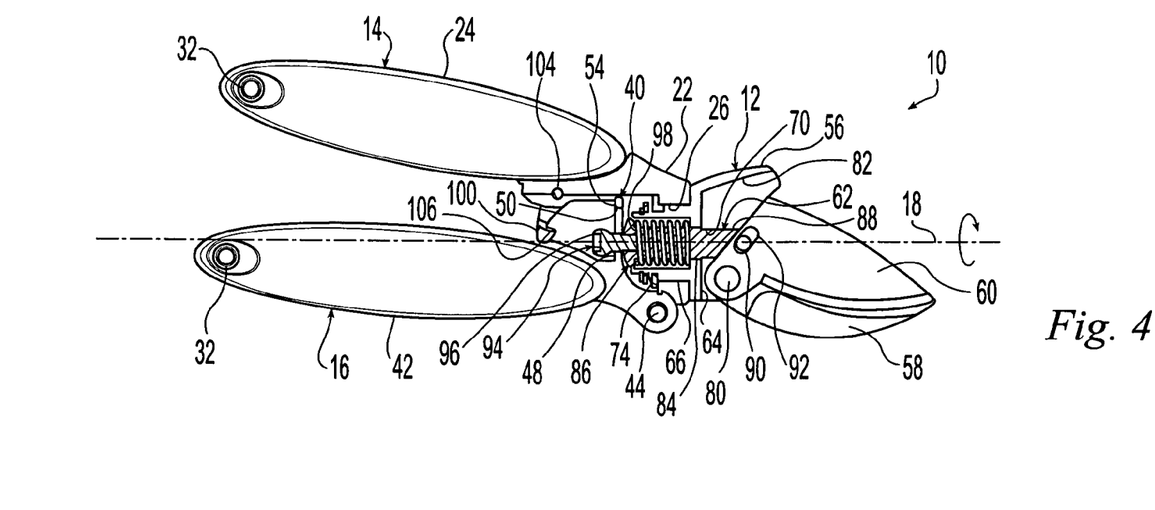
FIG. 4 is a left-side elevational view of the pruner of FIGS. 1 to 3 wherein portions of various components are cut-away for clarity.

The illustrated actuator 40 includes a flange 48 vertically extending from an upper side of the second arm 38 so that the flange 48 is substantially perpendicular to the longitudinal axis 18 when the handles 14, 16 are in a closed position (best shown in FIG. 4). The illustrated flange 48 forms a longitudinally extending opening 50 which is parallel to and upwardly offset from the longitudinal axis 18 when the handles 14, 16 are in a closed position (best shown in FIG. 4). The flange 48 also forms a forward facing first or forward abutment 52 encircling the forward end of the opening 50 and a rearward facing second or rearward abutment 54 encircling the rearward end of the opening 50. The first and second abutments 52, 54 are sized and shaped to cooperate with the cutting head 12 as described in more detail hereinafter. The elongate rear portion of the illustrated second arm 38 extends rearwardly and generally parallel to the longitudinal axis 18 from a lower side of the body 22 when the handles 14, 16 are in a closed position (best shown in FIG. 4) and extends rearwardly and downwardly from a lower side of the body 22 when the handles 14, 16 are in an open position (best shown in FIG. 6). The second arm 38 can be formed of any suitable material such as, for example, plastic, steel, aluminum or the like.

The second or lower grip 42 is sized and shaped to accommodate grasping by the user and is selectively movable between a fully retracted configuration (best shown in FIGS. 1 to 4) and a fully extended configuration (best shown in FIGS. 6 and 7). The illustrated second grip 42 is constructed and operated identical to the first grip 24 except that the second grip 42 pivots in a direction opposite to that of the first grip 24. Therefore, further detailed description of the second grip 42 is not provided because such a description is provided with regard to the first grip 24 hereinabove.

The illustrated cutting head 12 includes a pivot member 56 pivotably connecting the cutting head 12 to the body 22, a fixed first or lower blade or hook 58 carried by the pivot member 56, a movable second or upper blade 60 carried by the pivot member 56, and a hammer or connector 62 operably connecting the movable second blade 60 to the lower handle actuator 40. The illustrated pivot member 56 has a main wall 64 extending perpendicular to the longitudinal axis 18 and a tubular-shaped protrusion 66 rearwardly extending from the main wall 64. The protrusion 66 is sized and shaped to be closely received in the passage 26 of the first handle body 22 so that the pivot member 56 is rotatable relative to the first handle body 22 on the longitudinal axis 18. The illustrated main wall 64 forms a rearward facing abutment encircling the protrusion 66 which is sized and shaped to engage the forward facing abutment of the first handle body 22 to limit rearward movement of the pivot member 56 relative to the first handle body 22. The main wall 64 also forms a longitudinally extending opening 70 at the longitudinal axis 18 and opening into the protrusion 66. The illustrated opening 70 has a diameter which is smaller than an inner diameter of the protrusion 66 so that the main wall 64 forms a rearward-facing, annular-shaped abutment encircling the opening 70 within the protrusion 66. The illustrated protrusion 66 is provided with a retainer 74 forming a forward facing abutment which is sized and shaped to engage the rearward facing abutment of the first handle body 22 to limit forward movement of the pivot member 56 relative to the first handle body 22. Secured in this manner, the pivot member 56 is free to rotate relative to the first handle body 22 on the longitudinal axis 18 but is substantially prevented from moving in radial and axial directions relative to the first handle body 22.

The first and second blades 58, 60 are sized and shaped to cooperate in providing cutting action upon the actuation of the upper and lower handles 14, 16 in a known manner. The first and second blades 58, 60 are operatively connected to the upper and lower handles 14, 16 to provide the cutting action upon actuation of the upper and lower handles 14, 16. The illustrated first blade 58 is fixed to the pivot member 56 against relative movement therewith. The illustrated first blade 58 is formed as a unitary one-piece component with the pivot member 56 but can alternatively be formed as a separate component and rigidly secured thereto. The illustrated second blade 60 is pivotably connected to the pivot member 56 so that the second blade 60 is pivotable about a laterally extending pivot axis 78 perpendicular to the longitudinal axis 18 and located below the longitudinal axis 18. The illustrated pivot axis 78 is formed by a screw 80 laterally extending between a pair of laterally spaced apart walls forwardly extending from the main wall 64 of the pivot member 56. The upper end of the walls are connected by an upper wall which forms an abutment 82 which limits outward pivotable movement of the second blade 60 away from the first blade 58 when in the full open position (best shown in FIG. 6).

The illustrated connector 62 operably connects the movable second blade 60 to the actuator 40 of the movable second handle 16 so that the second blade 60 is moved relative to the first blade 58 to provide cutting action upon actuation of the handles 14, 16. The illustrated connector 62 has a cylindrical-shaped central portion 84 which extends through the opening 70 in the main wall 64 and the protrusion 66 of the pivot member 56. The rear end of the illustrated connector 62 is provided with an enlarged diameter head 86 sized and shaped for engaging the actuator flange 48 of the second handle 16 as described in more detail hereinafter. The illustrated head 86 forms a rearward facing abutment. The forward end of the illustrated connector 62 forms a slot 88 for receiving the second blade 60 therein. A laterally extending pin 90 is rigidly secured to the connector at the slot 88 and extends through a slot 92 formed in the second blade 60 to form a pin-and-slot connection between the connector 62 and the second blade 60. The rearward end of the illustrated connector 62 is provided with an extension 94 which rearwardly extends through the opening 50 of the actuator flange 48. The illustrated extension 94 is provided with an enlarged head 96 at its rearward end sized and shaped for engaging the actuator flange 48 of the second handle 16 as described in more detail hereinafter.

The illustrated connector 62 is provided with a spring member 98 which resiliently biases the connector 62 in a rearward direction so that the hand pruner 10 is biased to the open position. The rearward bias of the connector 62 causes the connector 62 to engage the flange abutment 52 and move the second handle 16 downward and also causes the second blade 60 to move upward against the upper abutment 82 and spaced from the first blade 58 (best shown in FIG. 6). It is noted that rearward movement of the illustrated connector 62 is limited by the engagement of the second blade 60 against the upper abutment 82 and downward movement of the illustrated second handle 16 is limited by engagement of the flange 48 with the connector extension 94. The illustrated spring member 98 is a compression coil spring located about the connector central portion 84 and acting between the forward facing abutment of the connector head 86 and the rearward facing abutment of the pivot member main wall 64. It is noted that any other suitable type of spring member can alternatively be utilized.

Constructed in this manner, the connection between the pivot member 56 and the second handle 16 permits the cutting head 12 to rotate on the longitudinal axis 18. The pivot member 56 carries the first and second blades 58, 60 as the cutting head 12 rotates so that the blades 58, 60 can be selectively moved between an infinite number of orientations by rotating the cutting head 12 on the longitudinal axis 18. The illustrated cutting head 12 provides infinite adjustment but can alternatively provide a finite number of orientations. The cutting head 12 is preferably rotatable over at least one full rotation, that is 360 degrees, about the longitudinal axis 18 but can alternatively be limited to moving less than a full rotation such as, for example, 90 degrees or 180 degrees. The cutting head 12 preferably freely rotates but if desired a locking mechanism can be provided to removably secure the cutting head 12 in desired positions over a portion or all of its range of motion. The locking mechanism can be of any suitable type.

Figure 3:
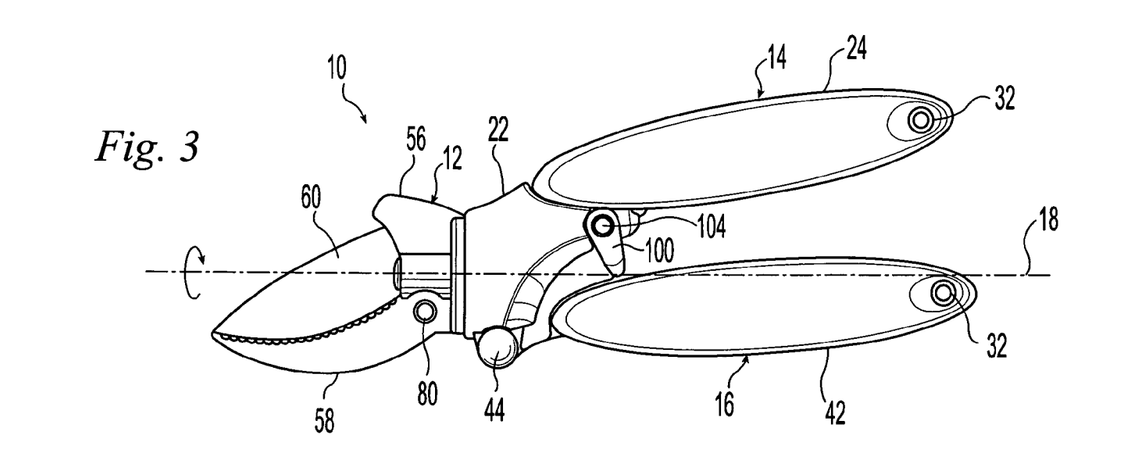
FIG. 3 is a right-side elevational view of the pruner of FIGS. 1 and 2.

The illustrated hand pruner 10 is provided with a locking member 100 which removably secures the hand pruner 10 in a closed position (best shown in FIGS. 3 and 4). The illustrated locking member 100 is generally "U" shaped and pivotably connected to the first arm 20 so that the locking member 100 is pivotable about a laterally extending pivot axis perpendicular to the longitudinal axis 18. The illustrated pivot axis is formed by a rivet 104 laterally extending through the body 22 of the first arm 20. The locking member 100 is manually pivotable between a locking position wherein the locking member 100 engages an abutment 106 of the second handle 16 to substantially prevent movement of the second handle 16 out of the closed position and a releasing position where in the locking member 100 is disengaged from the abutment 106 and the second handle 16 is free to be moved from the closed position to the opening position by the spring member 98.

Figure 1:
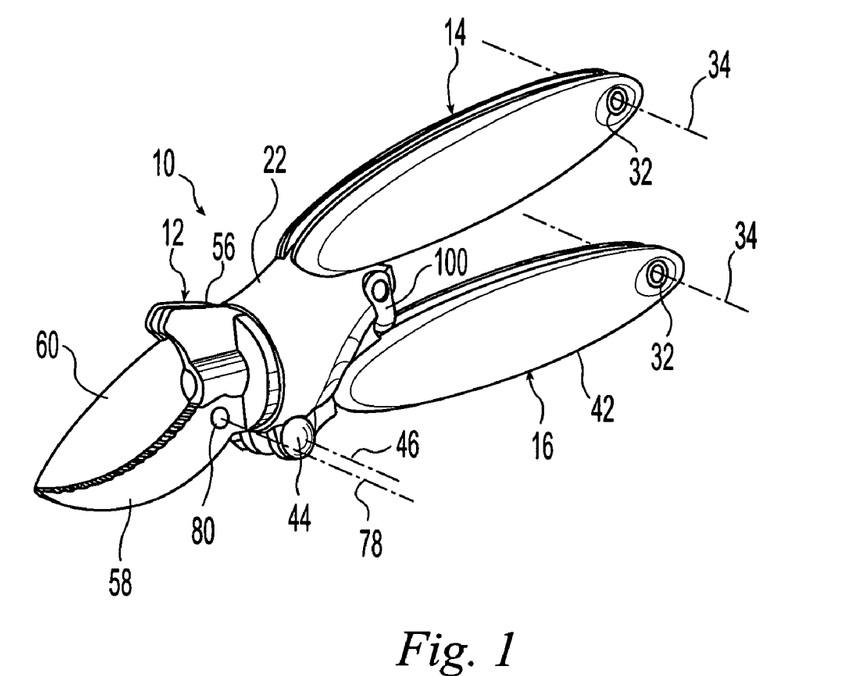
FIG. 1 is a top-front-left perspective view of a hand pruner according to a preferred embodiment of the present invention, wherein the pruner is in a closed position and handles of the pruner are in a retracted configuration.
Figure 2:
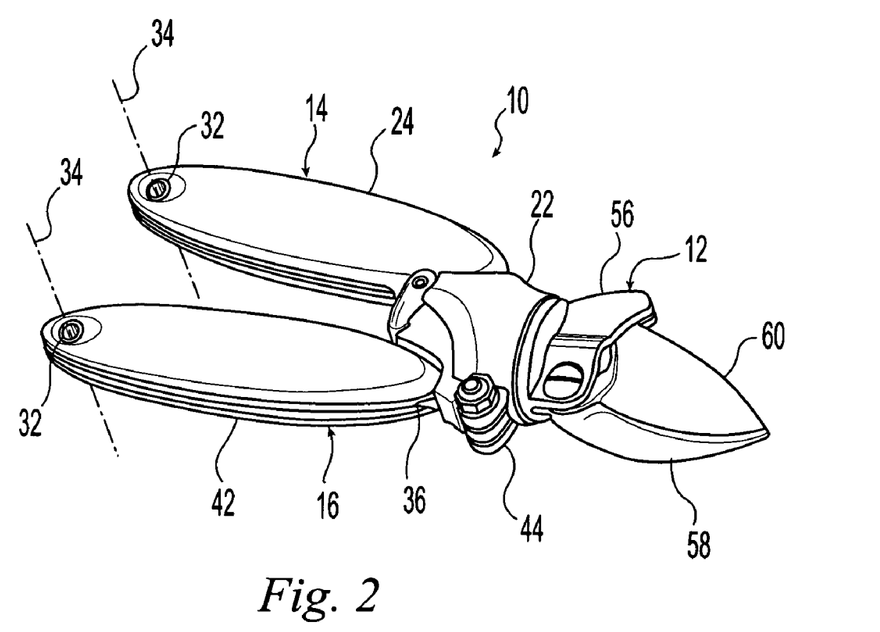
FIG. 2 is a bottom-front-right perspective view of the pruner of FIG. 1.

Typically the locking member 100 is in its locking position to secure the hand pruner 10 in its closed position during storage (best shown in FIGS. 2 to 4). To use the hand pruner 10, the user manually pivots the lock member 100 from its locking position to its releasing position and the spring member 98 resiliently moves the hand pruner 10 from its closed position to its open position as describe hereinabove (best shown in FIGS. 5 and 6). The user selects an item to be cut such as, a branch, limb, or stalk and positions the hand pruner 10 with the item to be cut located between the cutting blades 58, 60 while holding the handles 14, 16 in a hand. If the item to be cut is not at a convenient orientation to be cut by the vertically oriented blades 58, 60, the cutting head 12 can be manually rotated to a desired orientation. For example for cutting a vertical stalk, it may be desirable to rotate the cutting head 12 about 90 degrees so that the blades 58, 60 have a substantially horizontal orientation while the handles 14, 16 remain in a comfortable vertical orientation. If the item to be cut will require a large force and/or is not easy to reach, the grips 24, 42 can be moved from their retracted positions to their extended positions. For example, cutting a thick branch located within a bush, it may be desirable to extend the handles 14, 16 so that the handles 14, 16 provide more reach and additional cutting force. With the hand pruner 10 positioned with the item to be cut located between the cutting blades 58, 60, the user squeezes the grips 24, 42 together to pivot the second handle flange abutment 52 against the connecter head 86 and forwardly move the connector 62 against the bias of the spring member 98. Forward movement of the connector 62 pivots the second blade 60 to provide a cutting and/or shearing action between the cutting blades 58, 60 to cut and/or shear the item to be cut. When the user releases the grips 24, 42, the spring member 98 resiliently returns the hand pruner 10 to the open position as described hereinabove and the hand pruner 10 is ready to cut another item.

It is apparent from the foregoing detailed description that the present invention provides an improved hand pruner 10 which is relatively comfortable to use and require relatively low hand strength due to both the extendible handles 14, 16 and the rotating cutting head 12. It is also apparent that the improved tools are reliable and versatile and have and relatively low manufacturing costs. Because of the universally adjustable cutting head 12, the user can prune at the proper cutting angle even if there hands cannot be positioned correctly. Because of the extendible handles 14, 16, the user can prune spots which could not otherwise be reached and can prune branches thicker than could otherwise be cut. It is noted that each of the features of the illustrated hand pruner 10 can be utilized independently or in combination, such as, for example, the rotatable cutting head 12 can be used alone or in combination with the extendible handles 14, 16 and the extendible handles 14, 16 can be utilized alone or in combination with the rotating cutting head 12.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A hand tool for cutting comprising, in combination:
    a cutting head including a first blade and a second blade sized and shaped to provide cutting action with the first blade;
    a first handle having a forward end;
    a body formed at the forward end of the first handle, said handle being in a fixed position relative to said body;
    a second handle;
    wherein the second handle is operatively connected to the second blade and structured to move said second blade in a cutting action upon actuation of the second handle; and
    wherein the cutting head is selectively rotatable about a central longitudinal axis and the cutting head carries the first and second blades upon rotation of the cutting head about the central longitudinal axis to move the first and second blades between a plurality of different orientations relative to the first and second handles.

2. The hand tool according to claim 1, wherein the first handle body forms a longitudinally extending passage defining the longitudinal axis, the cutting head includes a pivot member closely received within the passage and rotatable about the longitudinal axis relative to the body, and the first and second blades are carried by the pivot member.

3. The hand tool according to claim 2, wherein the first blade is rigidly secured to the pivot member to prevent relative movement therebetween and the second blade is pivotally secured to the pivot member to enable movement of the second blade relative to the first blade to selectively provide cutting action therebetween.

4. The hand tool according to claim 3, wherein the second handle is pivotally connected to the body of the first handle.

5. The hand tool according to claim 4, wherein the cutting head includes a connector operably connecting the second handle and the second blade so that pivoting motion of the second handle relative to the body moves the second blade relative to the first blade to provide cutting action therebetween and the cutting head is rotatable about the longitudinal axis.

6. The hand tool according to claim 5, wherein the connector is longitudinally movable along the longitudinal axis relative to the pivot member, a forward end of the connector is connected to the second blade with a pin and slot connection so that longitudinal movement of the connector in a forward direction pivots the second blade toward the first blade and longitudinal movement of the connector in a rearward direction pivots the second blade away from the first blade, and a rearward end of the connector engages the second handle so that longitudinal movement of the connector in a rearward direction pivots the second handle away from the first handle and pivotable movement of the second handle toward the first handle longitudinally moves the connector in a forward direction.

7. The hand tool according to claim 6, wherein the cutting head includes a spring member resiliently biasing the connector in a rearward direction.

8. The hand tool according to claim 6, wherein the second handle has a flange, the connector carries a rearward facing abutment engagable with the flange so that pivoting motion of the second handle toward the first handle moves the flange toward the rearward facing abutment to longitudinally move the connector in a forward direction.

9. The hand tool according to claim 1, wherein the second handle is pivotally connected to the first handle, and the cutting head includes a connector operably connecting the second handle and the second blade so that pivoting motion of the second handle relative to the first handle moves the second blade relative to the first blade to provide cutting action therebetween and the cutting head is rotatable about the longitudinal axis.

10. The hand tool according to claim 9, wherein the connector is longitudinally movable along the longitudinal axis relative to the first handle, a forward end of the connector is connected to the second blade with a pin and slot connection so that longitudinal movement of the connector in a forward direction pivots the second blade toward the first blade and longitudinal movement of the connector in a rearward direction pivots the second blade away from the first blade, and a rearward end of the connector engages the second handle so that longitudinal movement of the connector in a rearward direction pivots the second handle away from the first handle and pivotable movement of the second handle toward the first handle longitudinally moves the connector in a forward direction.

11. A hand tool for cutting comprising, in combination:
a first handle;
a second handle pivotally connected to the first handle;
a cutting head including a fixed first blade and a pivotable second blade sized and shaped to provide cutting action with the first blade;
wherein the first and second handles are each movable between a fully retracted configuration and a fully extended configuration to selectively adjust the length of the handles;
wherein the cutting head is selectively rotatable about a central longitudinal axis and the cutting head carries the first and second blades upon rotation of the cutting head about the central longitudinal axis to move the first and second blades between a plurality of different orientations relative to the first and second handles; and
wherein the cutting head includes a connector operably connecting the second handle and the second blade so that pivoting motion of the second handle relative to the first handle moves the second blade relative to the first blade to provide cutting action therebetween and the cutting head is rotatable about the longitudinal axis.

* * * * *

UNITED STATES PATENT AND TRADEMARK OFFICE
CERTIFICATE OF CORRECTION

PATENT NO. : 7,845,082 B2  
APPLICATION NO. : 11/095777  
DATED : December 7, 2010  
INVENTOR(S) : David Demar et al.

Page 1 of 1

It is certified that error appears in the above-identified patent and that said Letters Patent is hereby corrected as shown below:

Column 1, line 47, "and or" should read --and/or--.
Column 1, line 67, "second the handles." should read --second handles.--.
Column 2, line 1, "filly" should read --fully--.
Column 2, line 3, "handles" should read --handles.--.
Column 2, line 11, "second the handles." should read --second handles.--.
Column 2, line 37, "embodiments it will" should read --embodiments, it will--.
Column 4, line 13, "configuration the" should read --configuration, the--.
Column 7, line 37, "where in" should read --wherein--.
Column 7, line 39, "opening position" should read --open position--.
Column 7, line 47, "as describe" should read --as described--.
Column 7, line 54, "example" should read --example,--.
Column 8, line 11, "require" should read --requires--.
Column 8 line 14, "have and" should read --have--.
Column 8, line 17, "there" should read --their--.
Column 10, line 1, "ther-" should read --there--.
Column 10, line 2, "ebetween" should read --between--.

Signed and Sealed this
Tenth Day of July, 2012

David J. Kappos
*Director of the United States Patent and Trademark Office*